United States Patent
Berger et al.

(10) Patent No.: US 11,576,067 B2
(45) Date of Patent: Feb. 7, 2023

(54) TRANSMISSION IMBALANCE ESTIMATION

(71) Applicant: QUALCOMM Incorporated, San Diego, CA (US)

(72) Inventors: Peer Berger, Hod Hasharon (IL); Moshe Ben-Ari, Rehovot (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/009,728

(22) Filed: Sep. 1, 2020

(65) Prior Publication Data
US 2022/0070705 A1    Mar. 3, 2022

(51) Int. Cl.
| | | |
|---|---|---|
| *H04W 24/00* | (2009.01) | |
| *H04W 24/10* | (2009.01) | |
| *H04W 4/40* | (2018.01) | |
| *H04L 1/00* | (2006.01) | |
| *H04L 5/00* | (2006.01) | |
| *H04W 72/0446* | (2023.01) | |
| *H04B 7/06* | (2006.01) | |

(52) U.S. Cl.
CPC ........... *H04W 24/10* (2013.01); *H04L 1/0026* (2013.01); *H04L 5/005* (2013.01); *H04W 4/40* (2018.02); *H04W 72/0446* (2013.01); *H04B 7/0619* (2013.01)

(58) Field of Classification Search
CPC ....... H04W 24/00; H04W 24/10; H04W 4/30; H04W 4/40; H04W 28/0231; H04W 72/02; H04W 72/085; H04L 1/0023; H04L 1/0026; H04L 25/0202; H04L 25/024; H04L 27/2695; H04B 7/0619
See application file for complete search history.

(56) References Cited

U.S. PATENT DOCUMENTS

| | | | | |
|---|---|---|---|---|
| 5,929,811 A | * | 7/1999 | Rilling ................. | H04B 7/0845 342/383 |
| 6,212,368 B1 | * | 4/2001 | Ramesh ............... | H01Q 1/2291 455/437 |

(Continued)

OTHER PUBLICATIONS

International Search Report and Written Opinion—PCT/US2021/045709—ISA/EPO—dated Nov. 15, 2021 (202824WO).

*Primary Examiner* — Warner Wong
(74) *Attorney, Agent, or Firm* — Holland & Hart LLP

(57) ABSTRACT

Methods, systems, and devices for wireless communications are described to support estimation of a transmission quality imbalance between a set of antennas of a first user equipment (UE). The first UE may use the estimated transmission quality imbalance to determine a transmission diversity scheme that may decrease the transmission quality imbalance. The first UE may determine the transmission quality imbalance between the set of antennas by estimating a reception quality imbalance between the set of antennas. The first UE may estimate the reception quality imbalance for multiple subsets of a time period and may combine the reception quality imbalance estimations for the multiple subsets. The combined reception quality imbalance estimations may represent the transmission quality imbalance between the set of antennas, which may be used to determine a transmission diversity scheme for communicating a transmission to a second UE or a base station.

26 Claims, 10 Drawing Sheets

(56) References Cited

U.S. PATENT DOCUMENTS

| | | | |
|---|---|---|---|
| 2008/0123768 A1* | 5/2008 | Harel | H04B 7/0623 375/267 |
| 2009/0124290 A1 | 5/2009 | Tao et al. | |
| 2010/0080136 A1* | 4/2010 | Hunzinger | H04B 7/0404 370/252 |
| 2010/0329370 A1* | 12/2010 | Hochwald | H04B 7/0671 375/260 |
| 2012/0076087 A1* | 3/2012 | Muquet | H04W 52/42 370/329 |
| 2012/0195224 A1* | 8/2012 | Kazmi | H04L 1/1812 370/252 |
| 2014/0029689 A1 | 1/2014 | Liu et al. | |
| 2016/0094282 A1* | 3/2016 | Kazmi | H04B 7/0404 370/329 |
| 2016/0127007 A1* | 5/2016 | Wang | H04B 1/40 455/78 |
| 2019/0053171 A1* | 2/2019 | Jung | H04W 74/008 |
| 2019/0150050 A1* | 5/2019 | Kinthada Venkata | H04W 36/30 370/334 |
| 2019/0239233 A1* | 8/2019 | Ryu | H04B 7/063 |
| 2019/0285678 A1* | 9/2019 | Abadie | G01R 29/10 |
| 2020/0412417 A1* | 12/2020 | Calzolari | H04B 7/0404 |
| 2021/0288709 A1* | 9/2021 | Berger | H04B 7/0689 |

* cited by examiner

TRANSMISSION IMBALANCE ESTIMATION

FIELD OF TECHNOLOGY

The following relates to wireless communications, including transmission imbalance estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some UEs may include multiple antennas (e.g., a set of antennas) and may, in some cases, experience an imbalance in transmission quality between two or more of the multiple antennas.

SUMMARY

The described techniques relate to improved methods, systems, devices, and apparatuses that support transmission imbalance estimation. Generally, the described techniques provide for estimating a transmission quality imbalance between a set of antennas of a first user equipment (UE) (e.g., between first and second antennas of the UE). The first UE may use the estimated transmission quality imbalance to dynamically determine or select a transmission diversity scheme that may decrease the transmission quality imbalance and increase transmission gain or diversity (e.g., increase transmission quality). The first UE may, for example, estimate or determine the transmission quality imbalance between the set of antennas by estimating a reception quality imbalance between the set of antennas. The first UE may estimate the reception quality imbalance for multiple subsets of a time period, where, in some cases, the time period may represent multiple subframes and each subset of the time period may represent a subframe.

The first UE may combine the reception quality imbalance estimations for the multiple subsets. The combined reception quality imbalance estimations may represent or may be used to estimate the transmission quality imbalance between the set of antennas. The first UE may use the transmission quality imbalance to select or determine a transmission diversity scheme. The first UE may, for example, determine or select a number of antennas for communicating a transmission (e.g., an uplink or sidelink transmission) to a second UE and/or a base station based on the transmission quality imbalance.

A method of wireless communications at a UE is described. The method may include receiving, over a time period, a set of reference signals at a set of antennas of the UE, estimating a measure of a reception quality imbalance between the set of antennas for each subset of a set of subsets of the time period based at least part on receiving the set of reference signals, determining, for the time period, a measure of a transmission quality imbalance between the set of antennas based on estimating the measure of the reception quality imbalance, and determining a transmit diversity scheme for the set of antennas based on the measure of the transmission quality imbalance.

An apparatus for wireless communications at a UE is described. The apparatus may include a processor, memory coupled with the processor, and instructions stored in the memory. The instructions may be executable by the processor to cause the apparatus to receive, over a time period, a set of reference signals at a set of antennas of the UE, estimate a measure of a reception quality imbalance between the set of antennas for each subset of a set of subsets of the time period based at least part on receiving the set of reference signals, determine, for the time period, a measure of a transmission quality imbalance between the set of antennas based on estimating the measure of the reception quality imbalance, and determine a transmit diversity scheme for the set of antennas based on the measure of the transmission quality imbalance.

Another apparatus for wireless communications at a UE is described. The apparatus may include means for receiving, over a time period, a set of reference signals at a set of antennas of the UE, estimating a measure of a reception quality imbalance between the set of antennas for each subset of a set of subsets of the time period based at least part on receiving the set of reference signals, determining, for the time period, a measure of a transmission quality imbalance between the set of antennas based on estimating the measure of the reception quality imbalance, and determining a transmit diversity scheme for the set of antennas based on the measure of the transmission quality imbalance.

A non-transitory computer-readable medium storing code for wireless communications at a UE is described. The code may include instructions executable by a processor to receive, over a time period, a set of reference signals at a set of antennas of the UE, estimate a measure of a reception quality imbalance between the set of antennas for each subset of a set of subsets of the time period based at least part on receiving the set of reference signals, determine, for the time period, a measure of a transmission quality imbalance between the set of antennas based on estimating the measure of the reception quality imbalance, and determine a transmit diversity scheme for the set of antennas based on the measure of the transmission quality imbalance.

Some examples of the method, apparatuses, and non-transitory computer-readable medium described herein may further include operations, features, means, or instructions for transmitting an uplink signal based on the transmit diversity scheme for the set of antennas.

In some examples of the method, apparatuses, and non-transitory computer-readable medium described herein, determining the measure of the transmission quality imbalance may include operations, features, means, or instructions for combining the measure of the reception quality imbalance for each subset of the set of the subsets of the time period.

In some examples of the method, apparatuses, and non-transitory computer-readable medium described herein, estimating the measure of the reception quality imbalance may include operations, features, means, or instructions for determining, for each subset of the set of subsets of the time period, a difference between a first reference signal received power for a first antenna of the set of antennas and a second reference signal received power for a second antenna of the set of antennas.

In some examples of the method, apparatuses, and non-transitory computer-readable medium described herein, the difference between the first reference signal received power for the first antenna and the second reference signal received power for the second antenna includes an estimate of a gain difference between a first chain for the first antenna and a second chain for the second antenna.

In some examples of the method, apparatuses, and non-transitory computer-readable medium described herein, determining the measure of the transmission quality imbalance may include operations, features, means, or instructions for determining an average of the difference between the first reference signal received power and the second reference signal received power for the set of the subsets of the time period.

In some examples of the method, apparatuses, and non-transitory computer-readable medium described herein, estimating the measure of the reception quality imbalance may include operations, features, means, or instructions for determining, for each subset of the set of subsets of the time period, an absolute value of a difference between a first reference signal received power for a first antenna of the set of antennas and a second reference signal received power for a second antenna of the set of antennas.

In some examples of the method, apparatuses, and non-transitory computer-readable medium described herein, the absolute value of the difference between the first reference signal received power for the first antenna and the second reference signal received power for the second antenna includes an estimate of a spatial difference between a first chain for the first antenna and a second chain for the second antenna.

In some examples of the method, apparatuses, and non-transitory computer-readable medium described herein, estimating the measure of the transmission quality imbalance may include operations, features, means, or instructions for determining an average of the absolute value of the difference between the first reference signal received power and the second reference signal received power for the set of the subsets of the time period.

In some examples of the method, apparatuses, and non-transitory computer-readable medium described herein, determining the transmit diversity scheme for the set of antennas may include operations, features, means, or instructions for determining to transmit using two or more of the set of antennas, where the measure of the transmission quality imbalance indicates an imbalance that may be based on a spatial difference between the set of antennas.

In some examples of the method, apparatuses, and non-transitory computer-readable medium described herein, determining the transmit diversity scheme for the set of antennas may include operations, features, means, or instructions for determining to transmit using one of the set of antennas, where the measure of the transmission quality imbalance may be less than a threshold or indicates an imbalance that may be based on a gain difference between the set of antennas.

Some examples of the method, apparatuses, and non-transitory computer-readable medium described herein may further include operations, features, means, or instructions for periodically switching an antenna used for transmitting uplink signals based on determining to transmit using one of the set of antennas, where the measure of the transmission quality imbalance may be less than the threshold.

In some examples of the method, apparatuses, and non-transitory computer-readable medium described herein, each subset of the time period includes a subframe and the time period includes a set of subframes.

In some examples of the method, apparatuses, and non-transitory computer-readable medium described herein, the set of reference signals may be associated with cellular vehicle to everything (C-V2X) communications.

DETAILED DESCRIPTION

Figure 1:
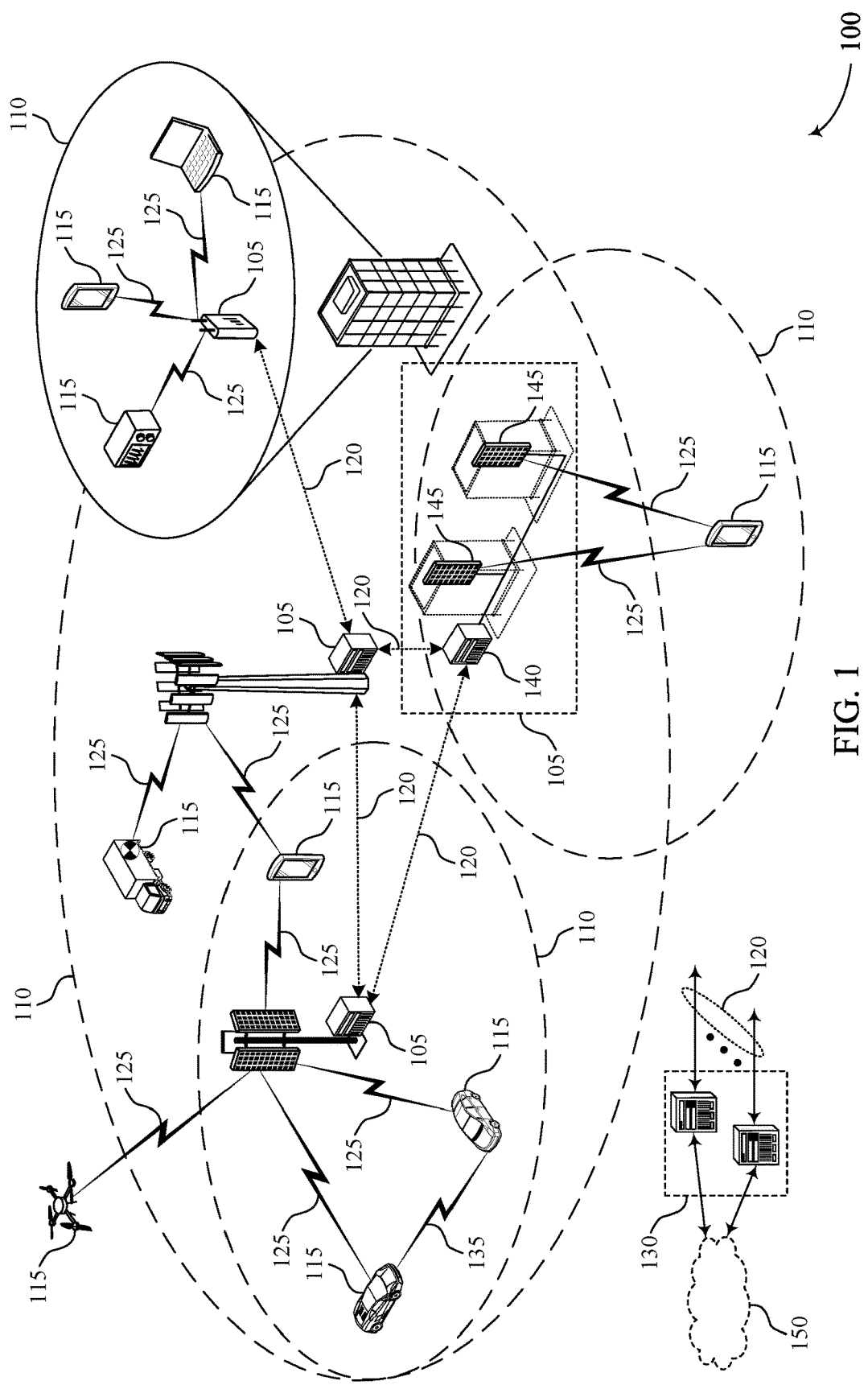
FIG. 1 illustrates an example of a wireless communications system that supports transmission imbalance estimation in accordance with aspects of the present disclosure.

A first user equipment (UE) may communicate with one or more other UEs (e.g., using sidelink communications), which may, for example, include a second UE. In some cases, the first UE may additionally or alternatively communicate with a base station (e.g., via uplink and/or downlink communications). The first UE may include or be coupled with a set of antennas (e.g., multiple antennas) and may use the set of antennas to receive signals from the base station and/or the second UE and to transmit signals to the base station and/or the second UE. While some examples described herein may include two antennas of the set of antennas (e.g., a first antenna and a second antenna), it is to be understood that the same examples may apply to more than two antennas without departing from the scope of the present disclosure. As described herein, an antenna may represent an antenna module (e.g., which may include multiple physical antennas) or a stand-alone antenna, among other examples. In some cases, the first UE may experience a transmission or reception quality imbalance between the first and second antennas of the antenna set (e.g., among other antennas). When experiencing a transmission or reception quality imbalance, a quality of a communication (e.g., one or more characteristics of the communication) may be different between the first and second antennas (e.g., among other antennas).

A transmission quality imbalance between antennas may reduce communication quality between the first UE and the second UE and/or between the first UE and the base station. For example, an error rate or a throughput may decrease as a result of the transmission quality imbalance. However, a UE may lack the capability or may not be configured for estimating or otherwise determining a transmission quality imbalance. In some cases, the first UE may be configured with a transmission diversity scheme for the set of antennas, which may represent a static transmission diversity scheme. For example, the first UE may refrain from changing one or more transmission diversity parameters based on the configured (e.g., static) transmission diversity scheme. Accordingly, the first UE may refrain from changing one or more transmission diversity parameters that may otherwise decrease the transmission quality imbalance between the set of antennas, and may experience reduced communication quality based on the unchanged transmission quality imbalance.

The present disclosure provides techniques for estimating a transmission quality imbalance between the set of antennas (e.g., between the first and second antennas). The first UE may use the estimated transmission quality imbalance to dynamically determine or select a transmission diversity scheme that may decrease the transmission quality imbalance and increase transmission gain or diversity (e.g., increase transmission quality). The first UE may, for example, estimate or determine the transmission quality imbalance between the set of antennas by estimating a reception quality imbalance between the set of antennas. The first UE may estimate the reception quality imbalance for multiple subsets of a time period, where, in some cases, the time period may represent multiple subframes and each subset of the time period may represent a subframe.

In one example, the first UE may estimate the reception quality imbalance for the multiple subsets (e.g., subframes) by determining a difference in reference signal received power (RSRP), or an absolute value of a difference in RSRP, between the set of antennas for one or more reference signals received from the second UE or the base station during each of the subsets. In some cases, the first UE may perform a similar procedure using a received power or another measurement of a different signal from the second UE or the base station.

The first UE may estimate the reception quality imbalance between the set of antennas for the multiple subsets (e.g., subframes) and may combine the reception quality imbalance estimations. For example, the first UE may combine the reception quality imbalance estimations by taking an average value across the multiple subsets (e.g., an average difference in RSRP or an average of the absolute value of the difference in RSRP). The combined reception quality imbalance estimations may represent or may be used to estimate the transmission quality imbalance between the set of antennas. The first UE may use the transmission quality imbalance to select or determine a transmission diversity scheme, which may reduce the effects of the transmission quality imbalance. The first UE may, for example, determine or select a number of antennas for communicating a transmission (e.g., an uplink or sidelink transmission) to the second UE and/or the base station based on the transmission quality imbalance, which may reduce the transmission quality imbalance.

Aspects of the disclosure are initially described in the context of wireless communications systems. Aspects of the disclosure are further illustrated by and described with reference to an estimation scheme, a process flow, apparatus diagrams, system diagrams, and flowcharts that relate to transmission imbalance estimation.

FIG. 1 illustrates an example of a wireless communications system 100 that supports transmission imbalance estimation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, cellular V2X (C-V2X) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A first UE 115 may communicate with one or more other UEs 115 (e.g., using sidelink communications, such as C-V2X communications), which may, for example, include a second UE 115. In some cases, the first UE 115 may additionally or alternatively communicate with a base station 105 (e.g., via uplink and/or downlink communications). The first UE 115 may include or be coupled with a set of antennas (e.g., multiple antennas) and may use the set of antennas to receive signals from the base station 105 and/or the second UE 115 and to transmit signals to the base station 105 and/or the second UE 115. In some cases, the first UE 115 may experience a transmission or reception quality imbalance between antennas of the antenna set, and the UE 115 may be unable to or lack a configuration for estimating or otherwise determining a transmission quality imbalance.

The present disclosure provides techniques for estimating a transmission quality imbalance between the set of antennas. The first UE 115 may use the estimated transmission quality imbalance to dynamically determine or select a transmission diversity scheme that may decrease the transmission quality imbalance and increase transmission gain or diversity (e.g., increase transmission quality). The first UE 115 may, for example, estimate or determine the transmission quality imbalance between the set of antennas by estimating a reception quality imbalance between the set of antennas. The first UE 115 may estimate the reception quality imbalance for multiple subsets of a time period, and may combine the reception quality imbalance estimations. The combined reception quality imbalance estimations may represent the transmission quality imbalance between the set of antennas. The first UE 115 may use the transmission quality imbalance to select or determine a transmission diversity scheme for communicating a transmission (e.g., an uplink or sidelink transmission) to a second UE 115 and/or a base station 105.

Figure 2:
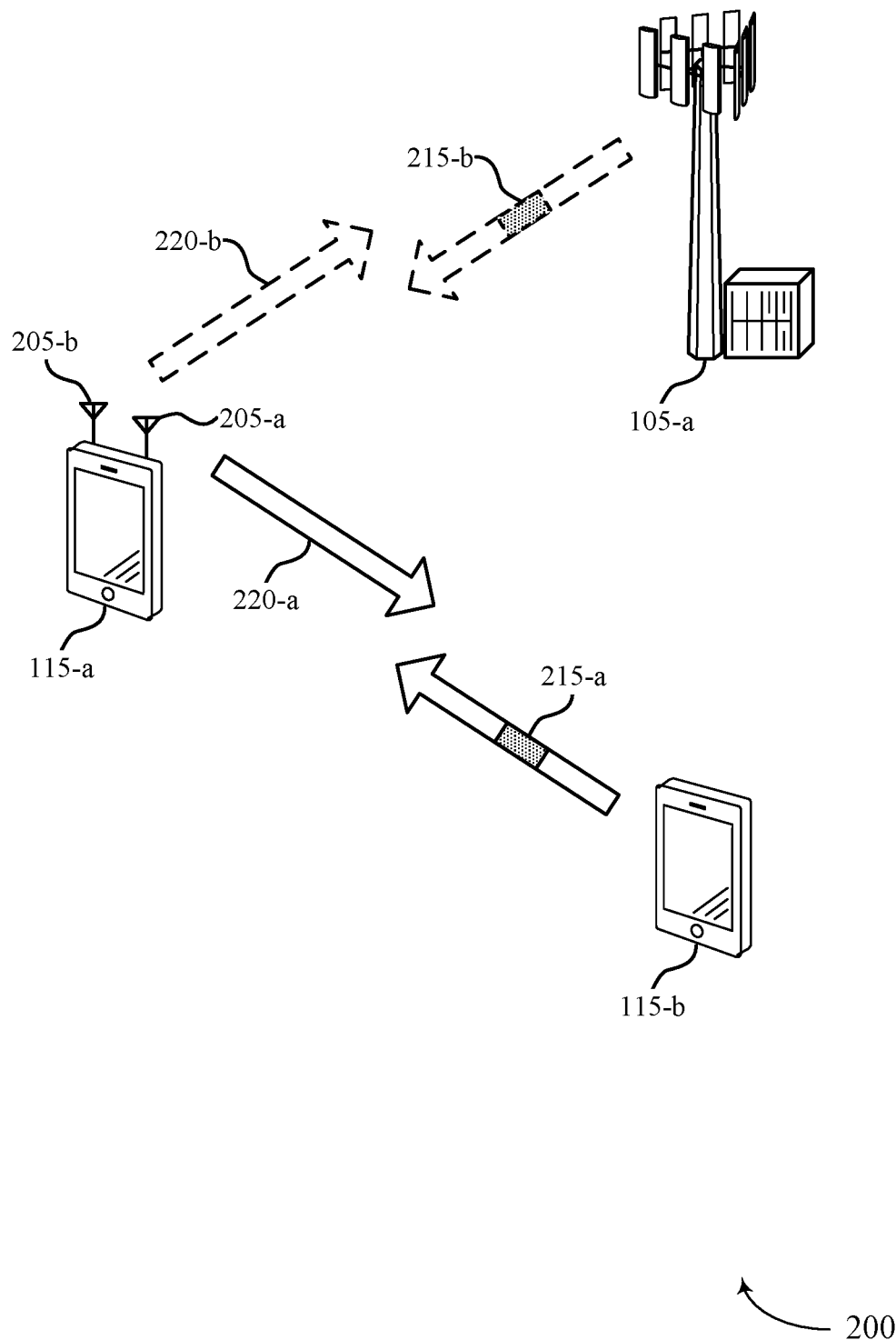
FIG. 2 illustrates an example of a wireless communications system that supports transmission imbalance estimation in accordance with aspects of the present disclosure.

FIG. 2 illustrates an example of a wireless communications system 200 that supports transmission imbalance estimation in accordance with aspects of the present disclosure. In some examples, wireless communications system 200 may implement aspects of wireless communications system 100. For example, wireless communications system 200 may include UEs 115-a and 115-b and a base station, which may represent respective examples of UEs 115 and a base station 105 described with reference to FIG. 1. UE 115-a may communicate with one or more UEs 115 (e.g., using sidelink communications, such as C-V2X communications), which may, for example, include UE 115-b. In some cases, UE 115-a may additionally or alternatively communicate with one or more base stations 105 (e.g., via uplink and/or downlink communications), which may, for example, include base station.

UEs 115-a and 115-b and base station 105-a may each include or be coupled with one or more antennas 205 for transmitting and receiving signals. For example, UE 115-a may include or be coupled with antennas 205-a and 205-b (e.g., among other antennas 205), and may use antennas 205-a and 205-b to receive signals from base station 105-a and/or UE 115-b and to transmit signals to base station 105-a and/or UE 115-b. While the examples described herein may include two antennas (e.g., antennas 205-a and 205-b), it is to be understood that the same examples may apply to more than two antennas without departing from the scope of the present disclosure (e.g., may apply to more than two antennas of UE 115-a that include antennas 205-a and 205-b). As described herein, an antenna may represent an antenna module (e.g., which may include multiple physical antennas) or a stand-alone antenna, among other examples.

In some cases, UE 115-a may experience a transmission or reception quality imbalance between antennas 205-a and 205-b (e.g., among other antennas). When experiencing a quality imbalance, a quality of a communication (e.g., one or more characteristics of the communication) may be different between antenna 205-a and antenna 205-b (e.g., among other antennas). For example, a gain or a gain pattern may be different for antenna 205-a and antenna 205-b.

The difference in the gain or the gain pattern may be influenced by one or more spatial characteristics of an antenna or a communication, or may be a function of a difference in gains between chains associated with antenna 205-a and antenna 205-b, respectively. For example, the chains for antennas 205-a and 205-b may have one or more different components, or one or more components of the chains may have different characteristics, such as having different cable attenuations (e.g., for respective cables). A quality imbalance (e.g., an instance of imbalance) may also be based on a channel instance associated with communications to or from antennas 205-a and 205-b. For example, communicating between devices may include transmitting from two transmit antennas 205 to one receive antenna 205, or vice versa, which may result in an imbalance (e.g., a transmission and/or reception imbalance).

A transmission quality imbalance between antennas 205-a and 205-b may reduce communication quality between UE 115-a and UE 115-b and/or may reduce communication quality between UE 115-a and base station 105-a. For example, an error rate may increase or a throughput may decrease as a result of the transmission quality imbalance.

The present disclosure provides techniques for estimating a transmission quality imbalance between antennas 205-*a* and 205-*b* (e.g., among other antennas 205). UE 115-*a* may use the estimated transmission quality imbalance to dynamically determine or select a transmission diversity scheme that may decrease the transmission quality imbalance and increase transmission gain or diversity (e.g., increase transmission quality).

UE 115-*a* may, for example, estimate or determine the transmission quality imbalance between antennas 205-*a* and 205-*b* by estimating a reception quality imbalance between antennas 205-*a* and 205-*b*. UE 115-*a* may estimate the reception quality imbalance for multiple subsets of a time period, where, in some cases, the time period may represent multiple subframes and each subset of the time period may represent a subframe (e.g., UE 115-*a* may estimate a reception quality imbalance for each subframe). In one example, UE 115-*a* may estimate the reception quality imbalance for each subset (e.g., subframe) by determining a difference in RSRP between antennas 205-*a* and 205-*b* for one or more reference signals 215 received during the subset.

For example, UE 115-*a* may receive, at both antenna 205-*a* and antenna 205-*b*, one or more reference signals 215-*a* from UE 115-*b* during a subset of the time period. UE 115-*a* may determine a difference between the RSRP of the one or more reference signals 215-*a* at antenna 205-*a* and the RSRP of the one or more reference signals 215-*a* at antenna 205-*b*, and may use the difference to represent the reception quality imbalance for the subset of the time period. UE 115-*a* may additionally or alternatively perform a similar procedure for estimating a reception quality imbalance associated with communications from base station 105-*a* (e.g., based on respective RSRPs associated with one or more reference signals 215-*b*).

In some cases, UE 115-*a* may determine the difference between the RSRPs associated with antennas 205-*a* and 205-*b*, and in some cases, UE 115-*a* may additionally or alternatively determine an absolute value of the difference between the RSRPs associated with antennas 205-*a* and 205-*b*. The difference in the RSRPs may, for example, represent a gain difference between the chains of antennas 205-*a* and 205-*b* and the difference in the absolute value of the RSRPs may represent a spatial difference between the chains of antennas 205-*a* and 205-*b*. In some cases, UE 115-*a* may perform a similar procedure using a received power or other measurement of a different signal from UE 115-*b* or base station 105-*a*.

UE 115-*a* may also estimate the reception quality imbalance between more than two antennas 205. For example, UE 115-*a* may perform the techniques described herein using more than two antennas 205 by determining a difference in RSRP (e.g., a difference or an absolute value of the difference) between different pairs of antennas 205 and comparing or combining the differences from the different pairs of antennas 205. Additionally or alternatively, UE 115-*a* may perform a single calculation for the more than two antennas 205 to determine a reception quality imbalance that takes into account each of the more than two antennas 205.

UE 115-*a* may estimate the reception quality imbalance between antennas 205-*a* and 205-*b* for multiple subsets (e.g., subframes) of the time period and may combine the reception quality imbalance estimations. For example, UE 115-*a* may combine the reception quality imbalance estimations by taking an average value from across the multiple subsets (e.g., an average difference in RSRP or an average of the absolute value of the difference in RSRP). The combined reception quality imbalance estimations may represent (e.g., may be used to approximate) or may be used to estimate the transmission quality imbalance between antennas 205-*a* and 205-*b* (e.g., among other antennas 205).

UE 115-*a* may use the transmission quality imbalance to select or determine a transmission diversity scheme, which may reduce the effects of the transmission quality imbalance. UE 115-*a* may, for example, determine or select a number of antennas 205 for communicating a transmission 220 (e.g., an uplink or sidelink transmission) to UE 115-*b* and/or base station 105-*a* based on the transmission quality imbalance. In a first example, UE 115-*a* may determine (e.g., based on the transmission quality imbalance) that the transmission quality imbalance is based on a gain difference between the chains for antennas 205-*a* and 205-*b* and may determine to transmit using one antenna 205 (e.g., antenna 205-*a* or 205-*b*). For example, one chain for antenna 205-*a* or 205-*b* may be associated with higher gains or a higher transmission quality (e.g., a difference in RSRP may exist after averaging or combining the reception quality imbalances), and UE 115-*a* may determine to use the antenna 205 associated with the higher gains or the higher transmission quality.

In a second example, UE 115-*a* may determine (e.g., based on the transmission quality imbalance) that the transmission quality imbalance is based on a spatial difference between the chains for antennas 205-*a* and 205-*b* and may determine to transmit using more than one antenna 205. For example, the antennas 205-*a* and 205-*b* may be associated with similar or same gains or transmission quality (e.g., after averaging or combining the reception quality imbalances), and UE 115-*a* may determine to use both antenna 205-*a* and 205-*b* for transmissions 220. In some cases, there may be a transmission quality imbalance within a subset (e.g., subframe) of the time period, but the transmission quality imbalance may average out and may become relatively small or zero after averaging the transmission quality imbalance over multiple subsets of the time period.

In a third example, UE 115-*a* may determine that the transmission quality imbalance is zero or is below a threshold and may determine to transmit using a single antenna 205. For example, UE 115-*a* may determine that, on average, none of the antennas 205 experience higher gains or transmission quality and may determine to communication transmissions using either antenna 205-*a* or 205-*b*. In some cases, UE 115-*a* may transmit using a single antenna 205 and may switch the transmitting antenna 205 to reduce degradation across the antennas 205 (e.g., because each of the antennas 205 may experience similar gains or transmission quality). For example, UE 115-*a* may determine that the transmission quality imbalance is below the threshold and may determine to transmit using antenna 205-*a*. After a time duration transmitting using antenna 205-*a*, UE 115-*a* may switch to transmit using antenna 205-*b* for a similar time duration, upon which UE 115-*a* may switch back to antenna 205-*a* or another antenna 205.

Figure 3:
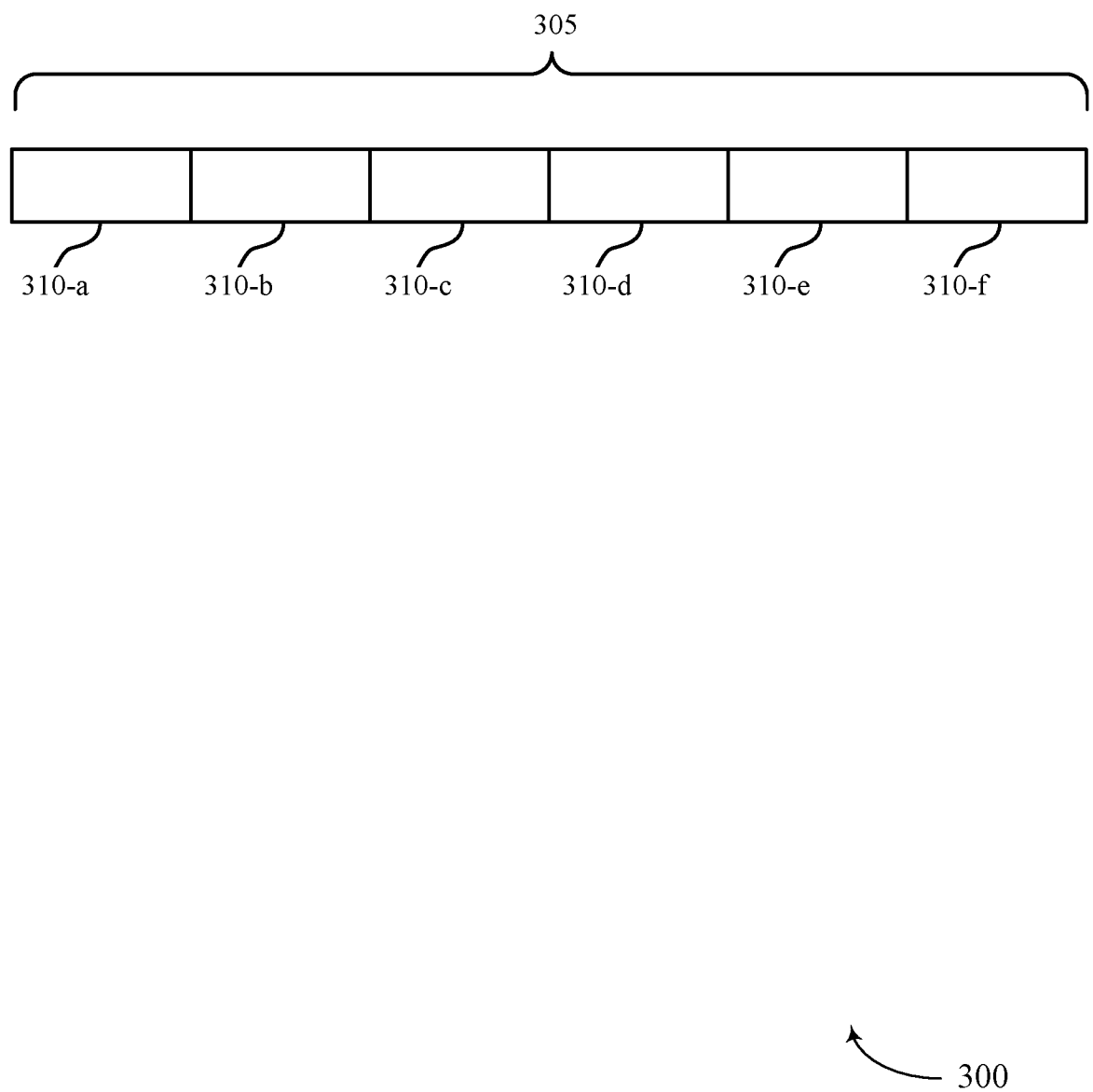
FIG. 3 illustrates an example of an estimation scheme that supports transmission imbalance estimation in accordance with aspects of the present disclosure.

FIG. 3 illustrates an example of an estimation scheme 300 that supports transmission imbalance estimation in accordance with aspects of the present disclosure. In some examples, estimation scheme 300 may implement or be implemented by aspects of wireless communications system 100 or 200. For example, a UE 115 may implement estimation scheme 300 to estimate a reception quality imbalance between two or more antennas of the UE 115 for multiple subsets (e.g., subframe 310) of a time period 305, as described with reference to FIG. 2. The UE 115 may represent an example of a UE 115 described with reference to FIGS. 1 and 2. The UE 115 may use the estimated reception quality imbalances to estimate or determine a transmission quality imbalance between the two or more antennas of the UE 115. The UE 115 may use the transmission quality imbalance to select or determine a transmission diversity scheme, as described with reference to FIG. 2.

In one example described herein, the multiple subsets of the time period 305 may represent subframes 310 (e.g., multiple subframes 310 of the time period 305, or a set of subframes 310). The time period 305 may represent a defined or configured time period 305, such as a transmission periodicity (e.g., 100 ms). The set of subframes 310 of the time period 305 may include each subframe of the time period 305, or in some examples, may include multiple subframes 310 but not all of the subframes 310 of the time period 305. For example, the set of subframes 310 may include each of subframes 310-*a* through 310-*f* or may include subframes 310-*b,* 310-d, and 310-*f,* or another combination of subframes 310 (e.g., any combination of subframes 310). The UE 115 may determine one or more measurements during each of the set of subframes 310 and may determine a reception quality imbalance for each of the set of subframes 310 based on the one or more measurements.

For example, as described herein, the UE 115 may measure a first RSRP for a first antenna of the two or more antennas and may measure a second RSRP for a second antenna of the two or more antennas, for each of the set of subframes 310. The UE 115 may determine a difference between the first RSRP and the second RSRP (e.g., which may represent positive or negative values), or may determine an absolute value of the difference between the first RSRP and the second RSRP, either or both of which may estimate the reception quality imbalance. The difference between the RSRPs for a subframe 310 may be represented by an equation such as equation (1):

$$RSRP_i - RSRP_j \quad (1)$$

where $RSRP_i$ represents the first RSRP associated with the first antenna and $RSRP_j$ represents the second RSRP associated with the second antenna. The absolute value of the difference between the RSRPs for a subframe 310 may be represented by an equation such as equation (2):

$$abs(RSRP_i - RSRP_j) \quad (2)$$

where abs represents an absolute value function, $RSRP_i$ represents the first RSRP associated with the first antenna, and $RSRP_j$ represents the second RSRP associated with the second antenna.

An RSRP of an antenna may be influenced or based on a channel instance, an estimation error, a spatial situation of the antenna (e.g., a radiation pattern, a communication angle, or an elevation of a communicating device), or any combination thereof. Accordingly, a difference in RSRPs between antennas, or an absolute value of the difference in RSRPs, may indicate a difference in a communication quality based on the channel instance, the estimation error, the spatial situation, or any combination thereof. The UE 115 may additionally or alternatively estimate the reception quality imbalance based on one or more other measurements without departing from the scope of the present disclosure.

The UE 115 may combine the estimated reception quality imbalances (e.g., the difference between the RSRPs or the absolute value of the difference in RSRPs) for each subframe 310 of the set of subframes 310. For example, as described herein, the UE 115 may determine an average of the difference between the RSRPs or an average of the absolute value of the difference in RSRPs. The average of the difference between the RSRPs of the two or more antennas may represent a gain difference between the respective chains associated with each of the two or more antennas. The average of the absolute value of the difference between the RSRPs may represent an averaged spatial difference between the respective chains associated with each of the two or more antennas.

Combining the estimated reception quality imbalances may remove or reduce influences from a spatial situation, channel instance, estimation error, or the like, that may be specific to one or more subframes 310 of the set of subframes 310. For example, combining the reception quality imbalances may combine information associated with different spatial situations, channel instances, estimation errors, or the like, across the set of subframes 310. The combined reception quality imbalances may be used to estimate or represent a transmission quality imbalance between the two or more antennas of the UE 115, and the UE 115 may use the estimated transmission quality imbalance to determine or select a transmission diversity scheme. The transmission diversity scheme may increase transmission quality at the UE 115.

Figure 4:
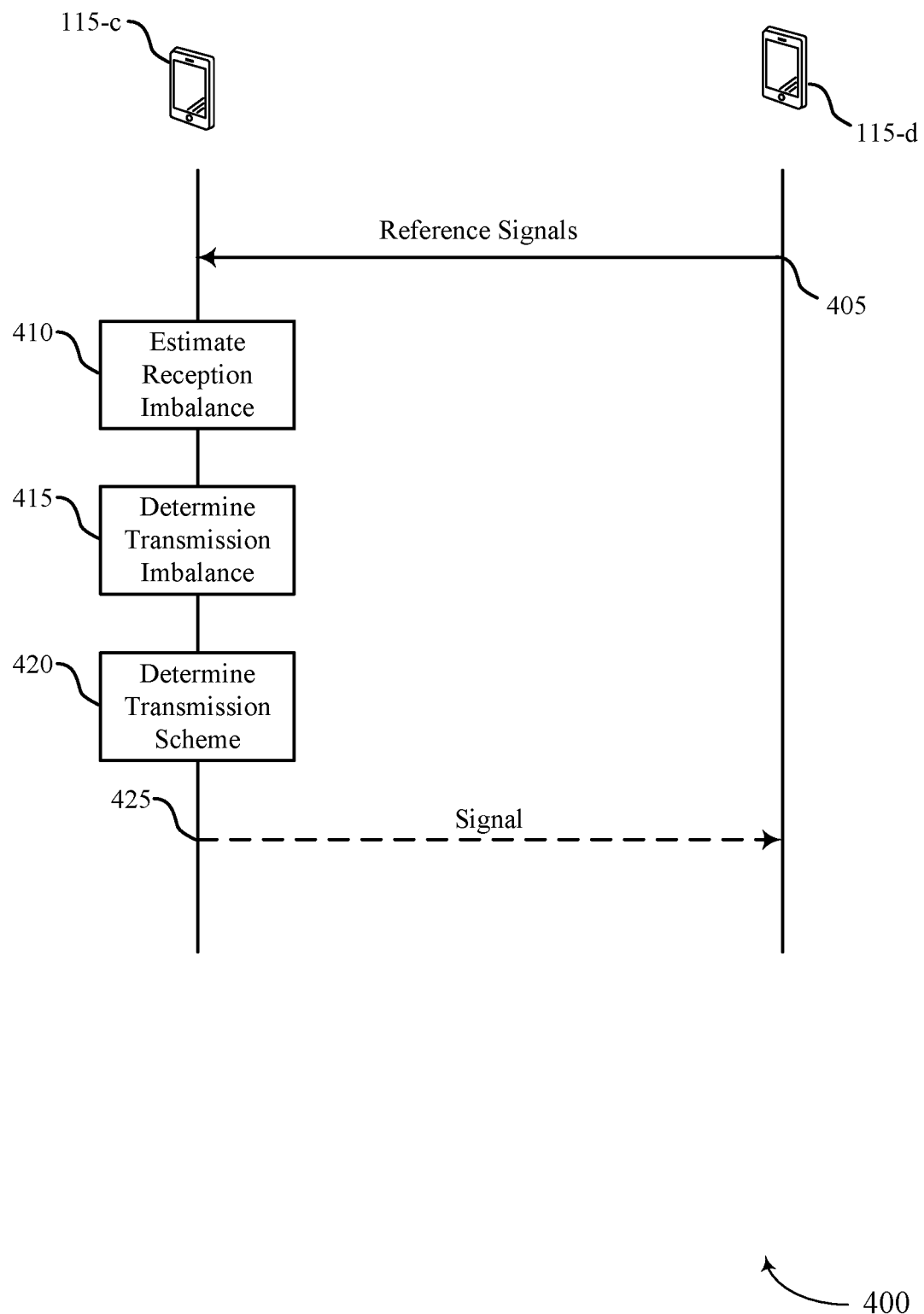
FIG. 4 illustrates an example of a process flow that supports transmission imbalance estimation in accordance with aspects of the present disclosure.

FIG. 4 illustrates an example of a process flow 400 that supports transmission imbalance estimation in accordance with aspects of the present disclosure. In some examples, process flow 400 may implement or be implemented by aspects of wireless communications system 100 or 200. For example, process flow 400 may be implemented by a UE 115-*c* and a UE 115-*d*, which may be examples of UEs 115 described with reference to FIGS. 1-3. Some aspects of process flow 400 may implement or be implemented by aspects of estimation scheme 300. UE 115-*c* may implement aspects of process flow 400 to estimate a transmission quality imbalance and determine a transmission scheme based on the transmission quality imbalance.

In the following description of process flow 400, the operations between UE 115-*c* and UE 115-*d* may be transmitted in a different order than the order shown, or the operations performed by UE 115-*c* and UE 115-*d* may be performed in different orders or at different times. For example, specific operations may also be left out of process flow 400, or other operations may be added to process flow 400. Although UE 115-*c* and UE 115-*d* are shown performing the operations of process flow 400, some aspects of some operations may also be performed by one or more other wireless devices. For example, some aspects of operations performed by UE 115-*d* may be performed by a base station 105 as described herein.

At 405, UE 115-*c* may receive multiple reference signals from UE 115-*d* at a set of antennas (e.g., two or more antennas) of UE 115-*c*. UE 115-*c* may receive the multiple reference signals over a time period (e.g., over multiple subframes) as described herein. In one example, UE 115-*c* may receive the multiple reference signals at a first antenna and a second antenna of the set of antennas. The multiple reference signals may result in one or more first RSRPs at the first antenna and one or more second RSRPs at the second antenna.

At 410, UE 115-*c* may estimate a measure of a reception quality imbalance between the set of antennas for each subset of a set of subsets (e.g., a set of subframes) of the time period based on receiving the multiple reference signals. UE 115-*c* may estimate the reception quality imbalance using one or more techniques described herein. For example, UE 115-*c* may determine an RSRP for each of the set of antennas (e.g., for the first and second antennas) for each subset of the set. UE 115-*c* may determine a difference between the RSRPs of different antennas, or may determine an absolute value of the difference between the RSRPs of different antennas, either or both of which may estimate the reception quality imbalance.

At 415, UE 115-*c* may determine, for the time period, a measure of a transmission quality imbalance between the set of antennas based on estimating the measure of the reception quality imbalance. For example, UE 115-*c* may combined the estimated reception quality imbalances for each of the subsets in order to determine the transmission quality imbalance. In some cases, UE 115-*c* may average the difference between the RSRPs of different antennas, or may average the absolute value of the difference between the RSRPs of different antennas, over the time period.

At 420, UE 115-*c* may determine a transmission diversity scheme (e.g., transmit diversity scheme) for the set of antennas based on the measure of the transmission quality imbalance. For example, UE 115-*c* may determine a number of antennas (e.g., and which antennas) with which to transmit a signal to UE 115-*d* based on the transmission quality imbalance. As described herein, UE 115-*c* may determine to transmit the signal using one antenna or using multiple antennas, and may, in some cases, periodically change a transmission antenna.

At 425, UE 115-*c* may transmit the signal to UE 115-*d* based on the transmission diversity scheme. UE 115-*c* may transmit the signal, for example, using the antennas associated with the determined transmission diversity scheme. The signal may represent a sidelink signal, or in some cases, may represent an uplink signal, and may experience increased communication quality based on the selected transmission diversity scheme.

Figure 5:
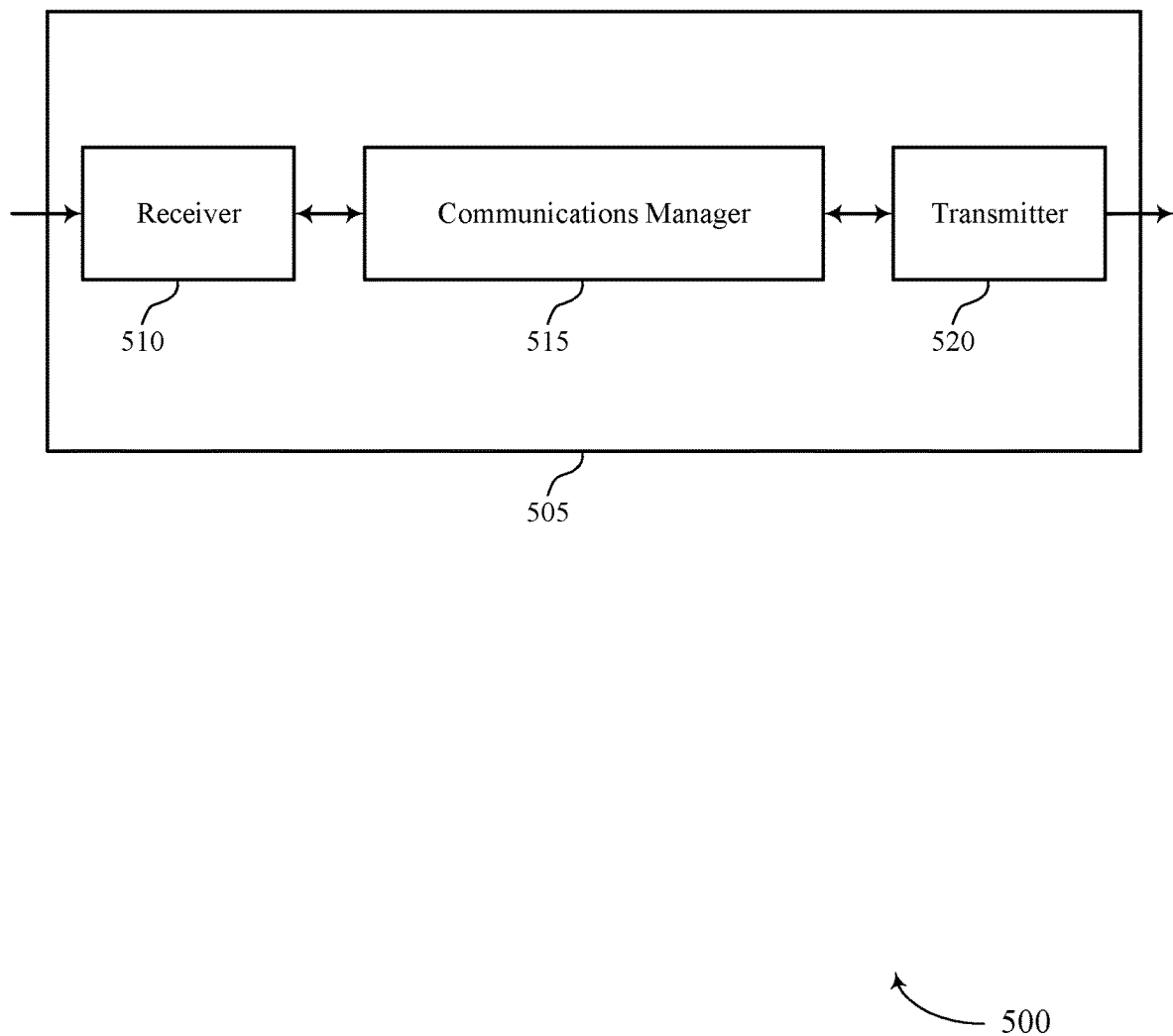
FIGS. 5 and 6 show block diagrams of devices that support transmission imbalance estimation in accordance with aspects of the present disclosure.

FIG. 5 shows a block diagram 500 of a device 505 that supports transmission imbalance estimation in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to transmission imbalance estimation, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, over a time period, multiple reference signals at a set of antennas of the UE, estimate a measure of a reception quality imbalance between the set of antennas for each subset of a set of subsets of the time period based at least part on receiving the multiple reference signals, determine, for the time period, a measure of a transmission quality imbalance between the set of antennas based on estimating the measure of the reception quality imbalance, and determine a transmit diversity scheme for the set of antennas based on the measure of the transmission quality imbalance. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by the communications manager 515, among other examples herein, may be implemented to realize one or more potential advantages. For example, communications manager 515 may increase available battery power, communication quality, and data throughput at a wireless device (e.g., a UE 115) by supporting estimation of a transmission quality imbalance and selection of a transmission diversity scheme based on the transmission quality imbalance. The increase in communication quality and data throughput may result in increased link performance and decreased overhead based on the selection of the transmission diversity scheme based on the transmission quality imbalance. Accordingly, communications manager 515 may save power and increase battery life at a wireless device (e.g., a UE 115) by strategically increasing a quality of communications at a wireless device (e.g., a UE 115).

Figure 6:
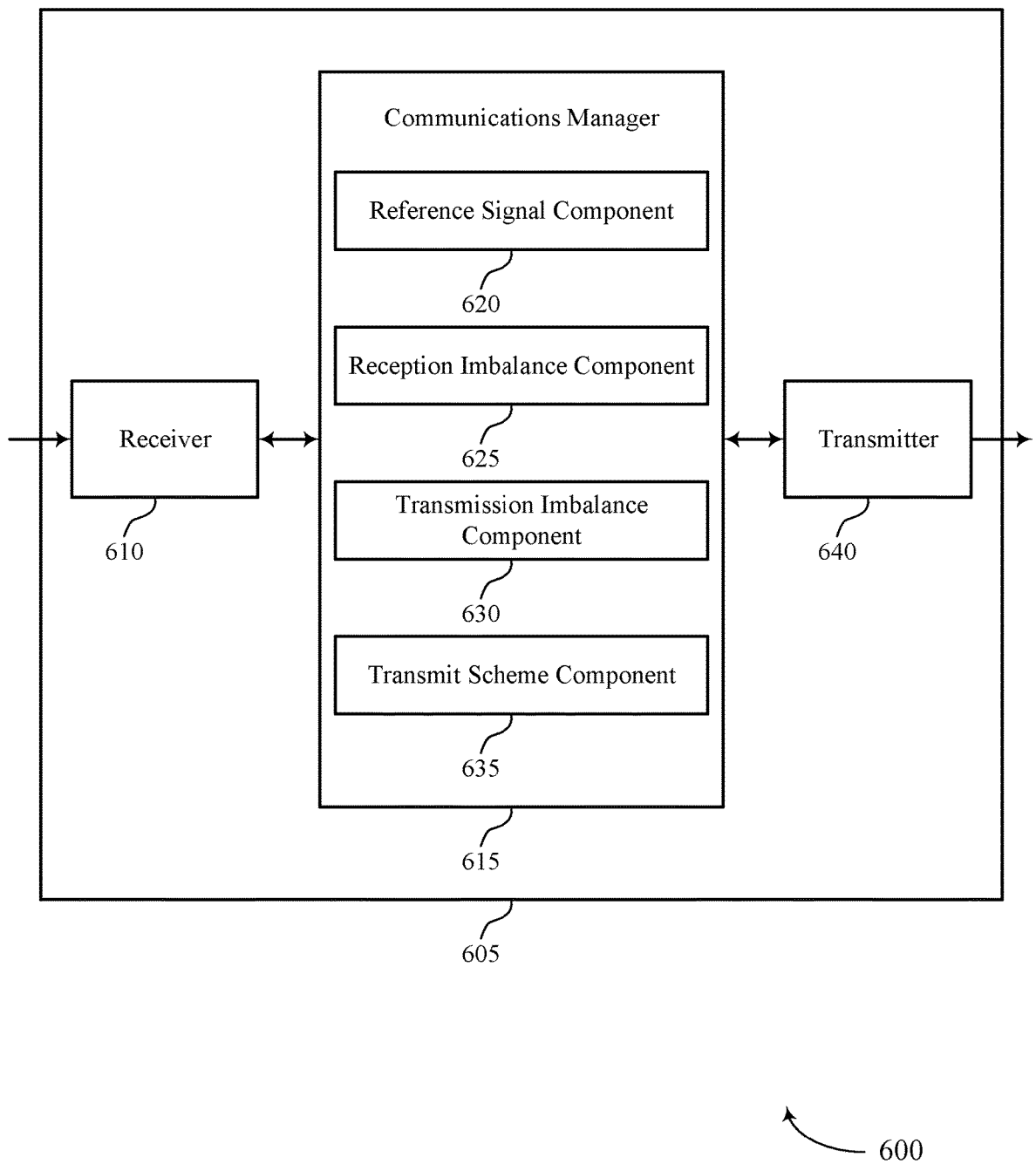

FIG. 6 shows a block diagram 600 of a device 605 that supports transmission imbalance estimation in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to transmission imbalance estimation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a reference signal component 620, a reception imbalance component 625, a transmission imbalance component 630, and a transmit scheme component 635. The communications manager 615 may be an example of aspects of the communications manager 810 described herein.

The reference signal component 620 may receive, over a time period, multiple reference signals at a set of antennas of the UE. The reception imbalance component 625 may estimate a measure of a reception quality imbalance between the set of antennas for each subset of a set of subsets of the time period based at least part on receiving the multiple reference signals. The transmission imbalance component 630 may determine, for the time period, a measure of a transmission quality imbalance between the set of antennas based on estimating the measure of the reception quality imbalance. The transmit scheme component 635 may determine a transmit diversity scheme for the set of antennas based on the measure of the transmission quality imbalance.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

A processor of a wireless device (e.g., controlling the receiver 610, the transmitter 640, or the transceiver 820 as described with reference to FIG. 8) may increase available battery power, communication quality, and data throughput. The increased communication quality may increase available battery power, communication quality, and data throughput (e.g., via implementation of system components described with reference to FIG. 7) compared to other systems and techniques, for example, that do not support estimation of a transmission quality imbalance and selection of a transmission diversity scheme based on the transmission quality imbalance, which may decrease communication quality and increase power consumption. Further, the processor of the UE 115 may identify one or more aspects of the transmission quality imbalance and/or the transmission diversity scheme. The processor of the wireless device may use the transmission quality imbalance and/or the transmission diversity scheme to perform one or more actions that may result in increased communication quality, as well as save power and increase battery life at the wireless device (e.g., by strategically supporting increasing communication quality by using the transmission diversity scheme), among other benefits.

Figure 7:
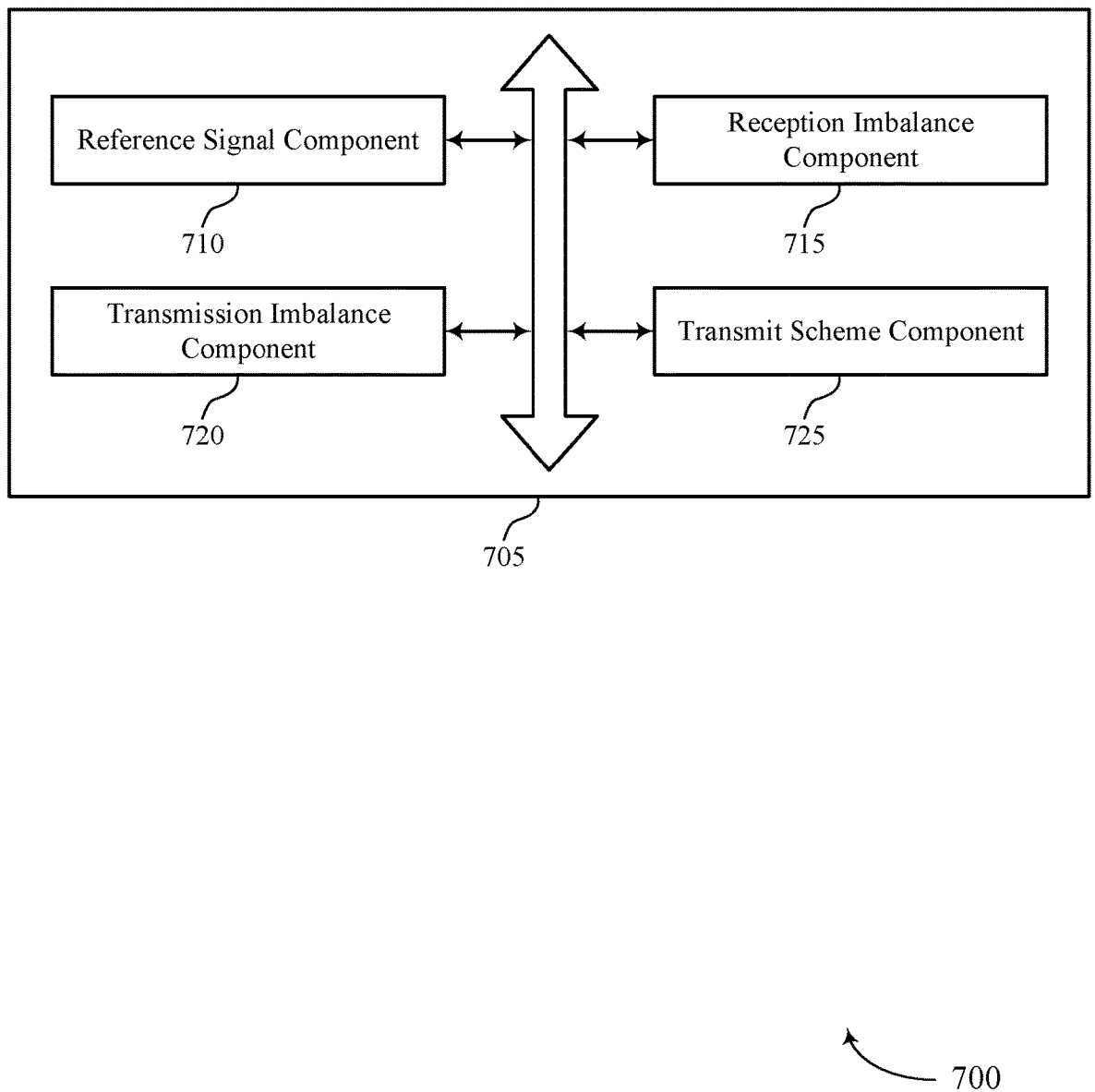
FIG. 7 shows a block diagram of a communications manager that supports transmission imbalance estimation in accordance with aspects of the present disclosure.

FIG. 7 shows a block diagram 700 of a communications manager 705 that supports transmission imbalance estimation in accordance with aspects of the present disclosure. The communications manager 705 may be an example of aspects of a communications manager 515, a communications manager 615, or a communications manager 810 described herein. The communications manager 705 may include a reference signal component 710, a reception imbalance component 715, a transmission imbalance component 720, and a transmit scheme component 725. Each of these modules may communicate, directly or indirectly, with one another (e.g., via one or more buses).

The reference signal component 710 may receive, over a time period, multiple reference signals at a set of antennas of the UE. In some cases, the multiple reference signals are associated with C-V2X communications.

The reception imbalance component 715 may estimate a measure of a reception quality imbalance between the set of antennas for each subset of a set of subsets of the time period based on receiving the multiple reference signals. In some cases, each subset of the time period includes a subframe and the time period includes a set of subframes.

In some examples, the reception imbalance component 715 may determine, for each subset of the set of subsets of the time period, a difference between a first RSRP for a first antenna of the set of antennas and a second RSRP for a second antenna of the set of antennas. In some examples, the reception imbalance component 715 may determine an average of the difference between the first RSRP and the second RSRP for the set of the subsets of the time period. In some cases, the difference between the first RSRP for the first antenna and the second RSRP for the second antenna includes an estimate of a gain difference between a first chain for the first antenna and a second chain for the second antenna.

In some examples, the reception imbalance component 715 may determine, for each subset of the set of subsets of the time period, an absolute value of a difference between a first RSRP for a first antenna of the set of antennas and a second RSRP for a second antenna of the set of antennas. In some examples, the reception imbalance component 715 may determine an average of the absolute value of the difference between the first RSRP and the second RSRP for the set of the subsets of the time period. In some cases, the absolute value of the difference between the first RSRP for the first antenna and the second RSRP for the second antenna includes an estimate of a spatial difference between a first chain for the first antenna and a second chain for the second antenna.

The transmission imbalance component 720 may determine, for the time period, a measure of a transmission quality imbalance between the set of antennas based on estimating the measure of the reception quality imbalance. In some examples, the transmission imbalance component 720 may combine the measure of the reception quality imbalance for each subset of the set of the subsets of the time period.

The transmit scheme component 725 may determine a transmit diversity scheme for the set of antennas based on the measure of the transmission quality imbalance. In some examples, the transmit scheme component 725 may transmit an uplink signal based on the transmit diversity scheme for the set of antennas.

In some examples, the transmit scheme component 725 may determine to transmit using two or more of the set of antennas, where the measure of the transmission quality imbalance indicates an imbalance that is based on a spatial difference between the set of antennas. In some examples, the transmit scheme component 725 may determine to transmit using one of the set of antennas, where the measure of the transmission quality imbalance is less than a threshold or indicates an imbalance that is based on a gain difference between the set of antennas. In some examples, the transmit scheme component 725 may periodically switch an antenna used for transmitting uplink signals based on determining to transmit using one of the set of antennas, where the measure of the transmission quality imbalance is less than the threshold.

Figure 8:
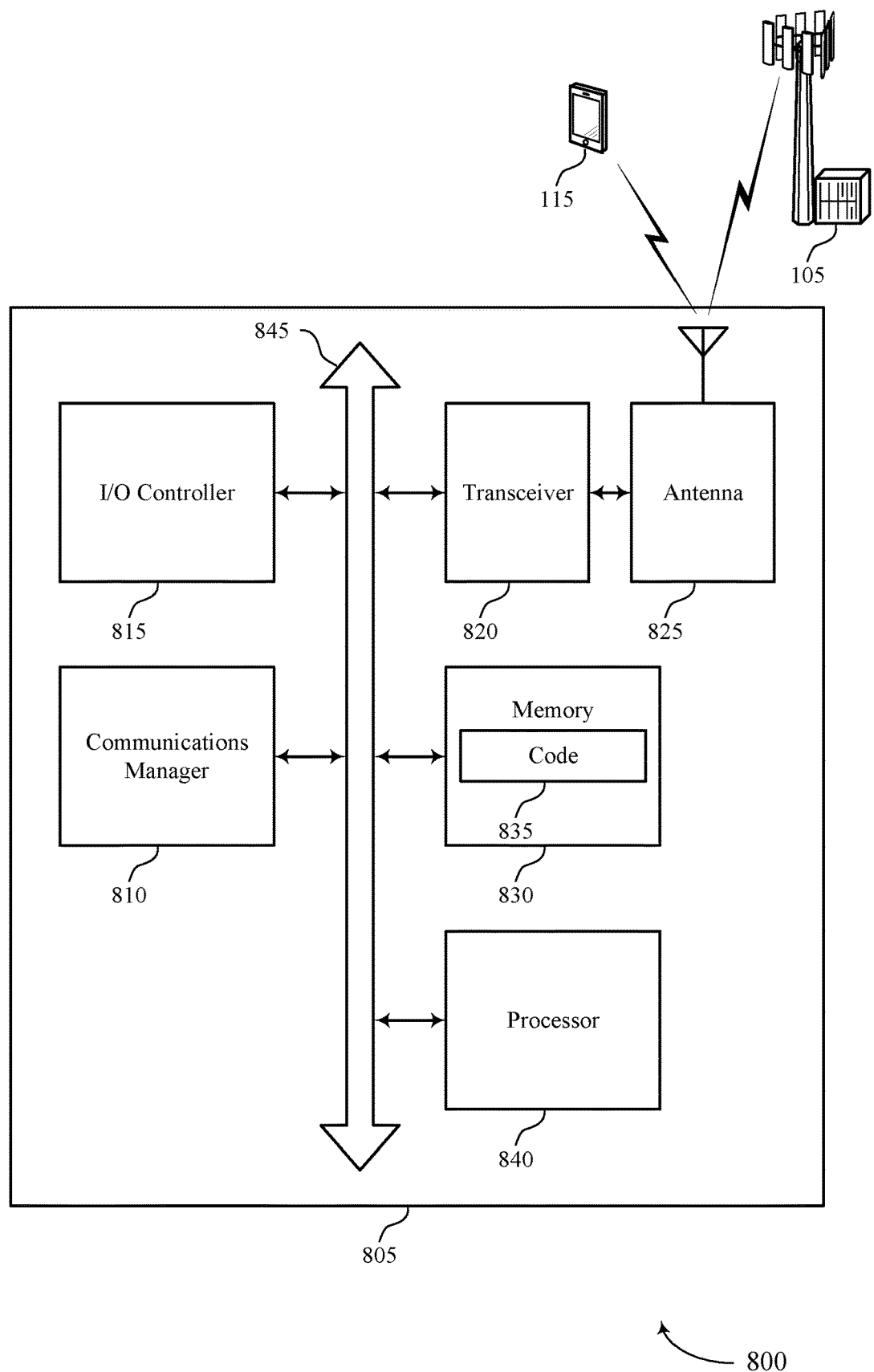
FIG. 8 shows a diagram of a system including a device that supports transmission imbalance estimation in accordance with aspects of the present disclosure.

FIG. 8 shows a diagram of a system 800 including a device 805 that supports transmission imbalance estimation in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, over a time period, multiple reference signals at a set of antennas of the UE, estimate a measure of a reception quality imbalance between the set of antennas for each subset of a set of subsets of the time period based at least part on receiving the multiple reference signals, determine, for the time period, a measure of a transmission quality imbalance between the set of antennas based on estimating the measure of the reception quality imbalance, and determine a transmit diversity scheme for the set of antennas based on the measure of the transmission quality imbalance.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting transmission imbalance estimation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
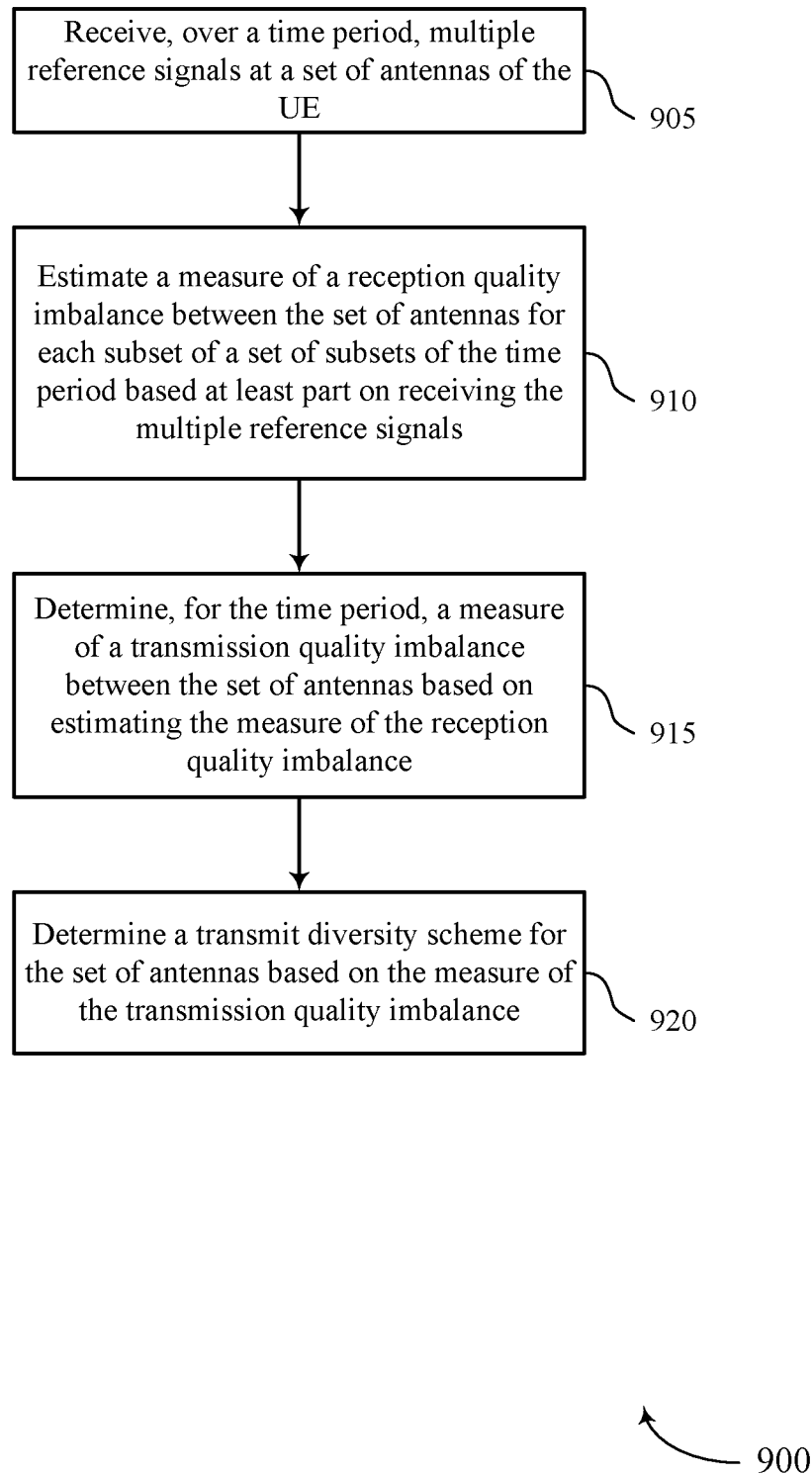
FIGS. 9 and 10 show flowcharts illustrating methods that support transmission imbalance estimation in accordance with aspects of the present disclosure.

FIG. 9 shows a flowchart illustrating a method 900 that supports transmission imbalance estimation in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive, over a time period, multiple reference signals at a set of antennas of the UE. The operations of 905 may be performed according to the methods described herein. In some examples, aspects of the operations of 905 may be performed by a reference signal component as described with reference to FIGS. 5 through 8.

At 910, the UE may estimate a measure of a reception quality imbalance between the set of antennas for each subset of a set of subsets of the time period based at least part on receiving the multiple reference signals. The operations of 910 may be performed according to the methods described herein. In some examples, aspects of the operations of 910 may be performed by a reception imbalance component as described with reference to FIGS. 5 through 8.

At 915, the UE may determine, for the time period, a measure of a transmission quality imbalance between the set of antennas based on estimating the measure of the reception quality imbalance. The operations of 915 may be performed according to the methods described herein. In some examples, aspects of the operations of 915 may be performed by a transmission imbalance component as described with reference to FIGS. 5 through 8.

At 920, the UE may determine a transmit diversity scheme for the set of antennas based on the measure of the transmission quality imbalance. The operations of 920 may be performed according to the methods described herein. In some examples, aspects of the operations of 920 may be performed by a transmit scheme component as described with reference to FIGS. 5 through 8.

Figure 10:
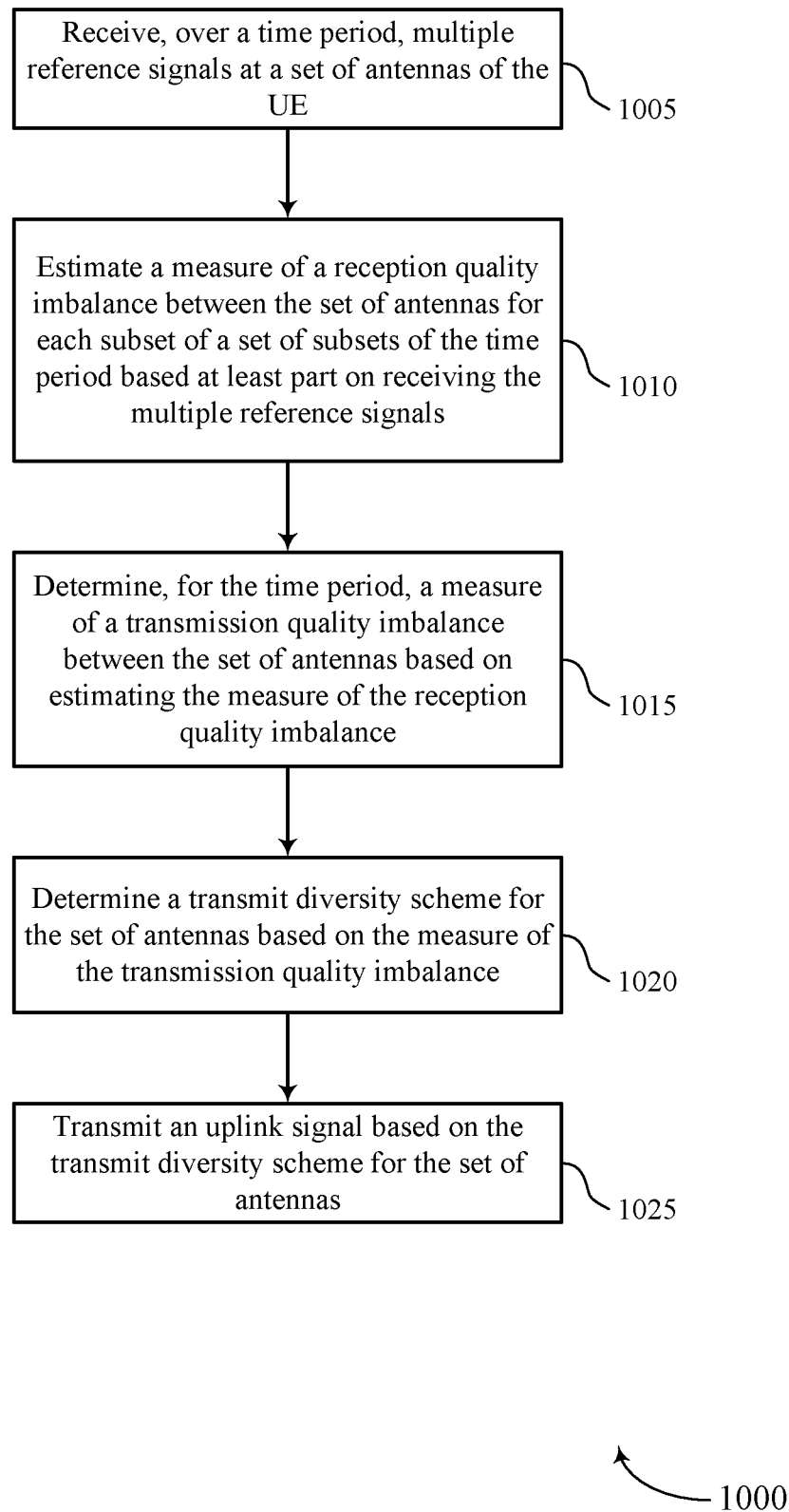

FIG. 10 shows a flowchart illustrating a method 1000 that supports transmission imbalance estimation in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive, over a time period, multiple reference signals at a set of antennas of the UE. The operations of 1005 may be performed according to the methods described herein. In some examples, aspects of the operations of 1005 may be performed by a reference signal component as described with reference to FIGS. 5 through 8.

At 1010, the UE may estimate a measure of a reception quality imbalance between the set of antennas for each subset of a set of subsets of the time period based at least part on receiving the multiple reference signals. The operations of 1010 may be performed according to the methods described herein. In some examples, aspects of the operations of 1010 may be performed by a reception imbalance component as described with reference to FIGS. 5 through 8.

At 1015, the UE may determine, for the time period, a measure of a transmission quality imbalance between the set of antennas based on estimating the measure of the reception quality imbalance. The operations of 1015 may be performed according to the methods described herein. In some examples, aspects of the operations of 1015 may be performed by a transmission imbalance component as described with reference to FIGS. 5 through 8.

At 1020, the UE may determine a transmit diversity scheme for the set of antennas based on the measure of the transmission quality imbalance. The operations of 1020 may be performed according to the methods described herein. In some examples, aspects of the operations of 1020 may be performed by a transmit scheme component as described with reference to FIGS. 5 through 8.

At 1025, the UE may transmit an uplink signal based on the transmit diversity scheme for the set of antennas. The operations of 1025 may be performed according to the methods described herein. In some examples, aspects of the operations of 1025 may be performed by a transmit scheme component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, over a time period, a plurality of reference signals at a plurality of antennas of the UE;
    estimating a respective measure of a reception quality imbalance between the plurality of antennas for each subset of a plurality of subsets of the time period based at least part on receiving the plurality of reference signals, wherein estimating the respective measures of the reception quality imbalance comprises determining, for each subset of the plurality of subsets of the time period, an absolute value of a difference between a first reference signal received power for a first antenna of the plurality of antennas and a second reference signal received power for a second antenna of the plurality of antennas;
    determining, for the time period, a measure of a transmission quality imbalance between the plurality of antennas based at least in part on estimating the respective measures of the reception quality imbalance, wherein determining the measure of the transmission quality imbalance comprises determining an average of the absolute value of the difference between the first reference signal received power and the second reference signal received power for the plurality of subsets of the time period; and
    determining a transmit diversity scheme for the plurality of antennas based at least in part on the measure of the transmission quality imbalance.

2. The method of claim 1, further comprising:
    transmitting an uplink signal based at least in part on the transmit diversity scheme for the plurality of antennas.

3. The method of claim 1, wherein determining the measure of the transmission quality imbalance comprises:
    combining the measure of the reception quality imbalance for each subset of the plurality of subsets of the time period.

4. The method of claim 1, wherein estimating the respective measures of the reception quality imbalance comprises:
    determining, for each subset of the plurality of subsets of the time period, a difference between a first reference signal received power for a first antenna of the plurality of antennas and a second reference signal received power for a second antenna of the plurality of antennas.

5. The method of claim 4, wherein the difference between the first reference signal received power for the first antenna and the second reference signal received power for the second antenna comprises an estimate of a gain difference between a first chain for the first antenna and a second chain for the second antenna.

6. The method of claim 4, wherein determining the measure of the transmission quality imbalance comprises:
    determining an average of the difference between the first reference signal received power and the second reference signal received power for the plurality of subsets of the time period.

7. The method of claim 1, wherein the absolute value of the difference between the first reference signal received power for the first antenna and the second reference signal received power for the second antenna comprises an estimate of a spatial difference between a first chain for the first antenna and a second chain for the second antenna.

8. The method of claim 1, wherein determining the transmit diversity scheme for the plurality of antennas comprises:
    determining to transmit using two or more of the plurality of antennas, wherein the measure of the transmission quality imbalance indicates an imbalance that is based at least in part on a spatial difference between the plurality of antennas.

9. The method of claim 1, wherein determining the transmit diversity scheme for the plurality of antennas comprises:
    determining to transmit using one of the plurality of antennas, wherein the measure of the transmission quality imbalance is less than a threshold or indicates an imbalance that is based at least in part on a gain difference between the plurality of antennas.

10. The method of claim 9, further comprising:
    periodically switching an antenna used for transmitting uplink signals based at least in part on determining to transmit using one of the plurality of antennas, wherein the measure of the transmission quality imbalance is less than the threshold.

11. The method of claim 1, wherein each subset of the time period comprises a subframe and the time period comprises a set of subframes.

12. The method of claim 1, wherein the plurality of reference signals is associated with cellular vehicle to everything (C-V2X) communications.

13. An apparatus for wireless communications at a user equipment (UE), comprising:
    a processor;
    memory coupled with the processor; and
    instructions stored in the memory and executable by the processor to cause the apparatus to:
    receive, over a time period, a plurality of reference signals at a plurality of antennas of the UE;
    estimate a respective measure of a reception quality imbalance between the plurality of antennas for each subset of a plurality of subsets of the time period based at least part on receiving the plurality of reference signals, wherein the instructions to estimate the respective measures of the reception quality imbalance are executable by the processor to cause the apparatus to determine, for each subset of the plurality of subsets of the time period, an absolute value of a difference between a first reference signal received power for a first antenna of the plurality of antennas and a second reference signal received power for a second antenna of the plurality of antennas;

determine, for the time period, a measure of a transmission quality imbalance between the plurality of antennas based at least in part on estimating the respective measures of the reception quality imbalance, wherein the instructions to determine the measure of the transmission quality imbalance are executable by the processor to cause the apparatus to determine an average of the absolute value of the difference between the first reference signal received power and the second reference signal received power for the plurality of subsets of the time period; and determine a transmit diversity scheme for the plurality of antennas based at least in part on the measure of the transmission quality imbalance.

14. The apparatus of claim 13, wherein the instructions are further executable by the processor to cause the apparatus to:
transmit an uplink signal based at least in part on the transmit diversity scheme for the plurality of antennas.

15. The apparatus of claim 13, wherein the instructions to determine the measure of the transmission quality imbalance are executable by the processor to cause the apparatus to:
combine the measure of the reception quality imbalance for each subset of the plurality of subsets of the time period.

16. The apparatus of claim 13, wherein the instructions to estimate the respective measures of the reception quality imbalance are executable by the processor to cause the apparatus to:
determine, for each subset of the plurality of subsets of the time period, a difference between a first reference signal received power for a first antenna of the plurality of antennas and a second reference signal received power for a second antenna of the plurality of antennas.

17. The apparatus of claim 16, wherein the difference between the first reference signal received power for the first antenna and the second reference signal received power for the second antenna comprises an estimate of a gain difference between a first chain for the first antenna and a second chain for the second antenna.

18. The apparatus of claim 16, wherein the instructions to determine the measure of the transmission quality imbalance are executable by the processor to cause the apparatus to:
determine an average of the difference between the first reference signal received power and the second reference signal received power for the plurality of subsets of the time period.

19. The apparatus of claim 13, wherein the absolute value of the difference between the first reference signal received power for the first antenna and the second reference signal received power for the second antenna comprises an estimate of a spatial difference between a first chain for the first antenna and a second chain for the second antenna.

20. The apparatus of claim 13, wherein the instructions to determine the transmit diversity scheme for the plurality of antennas are executable by the processor to cause the apparatus to:

determine to transmit using two or more of the plurality of antennas, wherein the measure of the transmission quality imbalance indicates an imbalance that is based at least in part on a spatial difference between the plurality of antennas.

21. The apparatus of claim 13, wherein the instructions to determine the transmit diversity scheme for the plurality of antennas are executable by the processor to cause the apparatus to:
determine to transmit using one of the plurality of antennas, wherein the measure of the transmission quality imbalance is less than a threshold or indicates an imbalance that is based at least in part on a gain difference between the plurality of antennas.

22. The apparatus of claim 21, wherein the instructions are further executable by the processor to cause the apparatus to:
periodically switch an antenna used for transmitting uplink signals based at least in part on determining to transmit using one of the plurality of antennas, wherein the measure of the transmission quality imbalance is less than the threshold.

23. The apparatus of claim 13, wherein each subset of the time period comprises a subframe and the time period comprises a set of subframes.

24. The apparatus of claim 13, wherein the plurality of reference signals is associated with cellular vehicle to everything (C-V2X) communications.

25. An apparatus for wireless communications at a user equipment (UE), comprising:
means for receiving, over a time period, a plurality of reference signals at a plurality of antennas of the UE;
means for estimating a respective measure of a reception quality imbalance between the plurality of antennas for each subset of a plurality of subsets of the time period based at least part on receiving the plurality of reference signals, wherein estimating the respective measures of the reception quality imbalance comprises determining, for each subset of the plurality of subsets of the time period, an absolute value of a difference between a first reference signal received power for a first antenna of the plurality of antennas and a second reference signal received power for a second antenna of the plurality of antennas;
means for determining, for the time period, a measure of a transmission quality imbalance between the plurality of antennas based at least in part on estimating the respective measures of the reception quality imbalance, wherein determining the measure of the transmission quality imbalance comprises determining an average of the absolute value of the difference between the first reference signal received power and the second reference signal received power for the plurality of subsets of the time period; and
means for determining a transmit diversity scheme for the plurality of antennas based at least in part on the measure of the transmission quality imbalance.

26. A non-transitory computer-readable medium storing code for wireless communications at a user equipment (UE), the code comprising instructions executable by a processor to:
receive, over a time period, a plurality of reference signals at a plurality of antennas of the UE;
estimate a respective measure of a reception quality imbalance between the plurality of antennas for each subset of a plurality of subsets of the time period based at least part on receiving the plurality of reference signals, wherein the instructions to estimate the respective measures of the reception quality imbalance are executable by the processor to determine, for each subset of the plurality of subsets of the time period, an absolute value of a difference between a first reference signal received power for a first antenna of the plurality of antennas and a second reference signal received power for a second antenna of the plurality of antennas;

determine, for the time period, a measure of a transmission quality imbalance between the plurality of antennas based at least in part on estimating the respective measures of the reception quality imbalance, wherein the instructions to determine the measure of the transmission quality imbalance are executable by the processor to determine an average of the absolute value of the difference between the first reference signal received power and the second reference signal received power for the plurality of subsets of the time period; and determine a transmit diversity scheme for the plurality of antennas based at least in part on the measure of the transmission quality imbalance.

* * * * *